(12) United States Patent (10) Patent No.: US 10,462,847 B2
Liu et al. (45) Date of Patent: Oct. 29, 2019

(54) WIRELESS COMMUNICATION SYSTEM, CONTROL CIRCUIT, AND CONTROL METHOD

(71) Applicant: KIWI TECHNOLOGY INC., Zhubei, Hsinchu County (TW)

(72) Inventors: Jian-Hong Liu, Zhubei (TW); Kuo-Chung Gan, Zhubei (TW)

(73) Assignee: KIWI TECHNOLOGY INC., Zhubei, Hsinchu County (TW)

( * ) Notice: Subject to any disclaimer, the term of this patent is extended or adjusted under 35 U.S.C. 154(b) by 0 days.

(21) Appl. No.: 15/862,451

(22) Filed: Jan. 4, 2018

(65) Prior Publication Data

US 2019/0132905 A1 May 2, 2019

(30) Foreign Application Priority Data

Oct. 27, 2017 (TW) .............................. 106137152 A

(51) Int. Cl.
*H04W 88/16* (2009.01)
*H04W 72/04* (2009.01)
(Continued)

(52) U.S. Cl.
CPC ....... *H04W 88/16* (2013.01); *H04W 72/0413* (2013.01); *H04W 72/0453* (2013.01); *H04W 84/045* (2013.01); *H04W 84/18* (2013.01)

(58) Field of Classification Search
CPC ....... H04L 47/10; H04L 43/16; H04L 43/106; H04L 45/22; H04W 40/02; H04W 24/00;
(Continued)

(56) References Cited

U.S. PATENT DOCUMENTS 5,278,984 A * 1/1994 Batchelor ............... H04L 51/26
719/314
5,822,317 A * 10/1998 Shibata ..................... G06F 1/14
370/395.62
(Continued)

FOREIGN PATENT DOCUMENTS

JP 2013222403 A 10/2013
JP 2014064121 A 4/2014
(Continued)

OTHER PUBLICATIONS

N. Sornin; "LoRaWAN 1.1 Specification", LoRa Alliance Technical Committee; Oct. 11, 2017.

*Primary Examiner* — Kwang B Yao
*Assistant Examiner* — Ricardo H Castaneyra
(74) *Attorney, Agent, or Firm* — Li & Cai Intellectual Property (USA) Office

(57) ABSTRACT

A wireless communication system is comprised of a control circuit, a wireless transmission module and one or more wireless gateway modules. The wireless gateway module receives data from a terminal via a channel. The control circuit performs a control method for instructing the wireless transmission module to transmit the data. The system utilizes the wireless transmission module to deal with the data from the gateway modules, and outputs the data via the module. This framework is a great benefit to the system due to its scalability and high performance. In the method, the wireless gateway module receives data, the control circuit computes a transmission time and generates a transmission request, the request and the data are transmitted to a transmission queue and then to the wireless transmission module, and the wireless transmission module determines a transmission channel for transmitting the data.

18 Claims, 4 Drawing Sheets

(51) Int. Cl.
*H04W 84/04* (2009.01)
*H04W 84/18* (2009.01)

(58) Field of Classification Search
CPC ..... H04W 24/02; H04W 24/08; H04W 84/18; H04W 84/045; H04W 88/16; H04W 72/0453; H04W 72/0413
See application file for complete search history.

(56) References Cited

U.S. PATENT DOCUMENTS

| | | | |
|---|---|---|---|
| 7,805,287 B1 * | 9/2010 | Jones | H04L 41/145 370/395.53 |
| 2008/0225836 A1 | 9/2008 | Fuhrmann | |
| 2015/0304193 A1 | 10/2015 | Ishii et al. | |
| 2016/0292051 A1 | 10/2016 | Fujimoto et al. | |
| 2017/0230074 A1 | 8/2017 | Rose et al. | |

FOREIGN PATENT DOCUMENTS

| | | |
|---|---|---|
| JP | 2015100070 A | 5/2015 |
| WO | WO 2016164584 A1 | 10/2016 |

* cited by examiner

WIRELESS COMMUNICATION SYSTEM, CONTROL CIRCUIT, AND CONTROL METHOD

BACKGROUND OF THE INVENTION

1. Field of the Invention

The disclosure is related to a wireless communication system, in particular to wireless communication system including a wireless transmission module used to output data and one or more wireless gateways that are used to receive data, namely the system that utilizes two kinds of devices for respectively performing receiving and transmitting operations.

2. Description of Related Art

The conventional wireless communication technology processes data transmission among network segments via a gateway. A conventional wireless gateway utilizes a gateway circuitry to process the packets received from various terminals. In addition to the gateway circuitry, the wireless gateway includes a controller for operating the gateway and a transceiver for transmitting data. In a network system, multiple wireless gateways can be disposed for processing the data transmitted and received among terminals.

FIG. 1 shows a schematic diagram describing the network architecture of a conventional wireless network system. The network system includes a plurality of wireless gateways 101, 102 and 103. The wireless gateway is such as a LoRa concentrator that is applicable to networking of IoT (Internet of Things) since it features long distance transmission and low power consumption. The LoRa concentrator conducts bi-directional communication with the terminals A, B, C, D and E. The terminals A, B, C, D and E can be the sensors and electronic devices in IoT. The wireless gateways 101, 102 and 103 process the data received from the terminals A, B, C, D and E that may separately connect with the same or different wireless gateways 101, 102 and 103. The communication protocol adapted to the network system is such as WiFi™, Bluetooth™ or Zigbee that is also applied to the terminals for data transmission. The wireless gateways 101, 102 and 103 allow a network server 110 to transmit data to the end service facilities 111, 112 and 113.

For example, the terminals A, B, C, D and E are such as the environmental sensors or device nodes disposed over a factory. The environmental sensors can be used to conduct smoke detection, temperature and humidity sensing, brightness detection, power sensing, and image surveillance. For receiving signals made by the terminals A, B, C, D and E over the factory, a network server 110 is provided for collecting the signals via the wireless gateways 101, 102 and 103 that are disposed at several critical locations. The signals received by the network server 110 are provided for further applications. The applications made by the service facilities 111, 112 and 113 are such as power surveillance, monitoring temperature and humidity, monitoring personnel movement, and monitoring the devices that form an IoT ecosystem.

In one conventional solution, the LoRa concentrator forms a basic communication unit with an LBT (Listen Before Talk) module. Compared to single communication unit, the plurality of communication units can extend the coverage of the system. The extendible wireless network system allows the system to provide more applications. The LBT modules cause the LoRa concentrator to have a function of LBT function. Therefore, a wireless communication system can obtain a free channel for data transmission by a clear channel assessment (CCA) that is performed by the LBT module as transmitting signals.

SUMMARY OF THE INVENTION

The disclosure is related to a wireless communication system, a control circuit and a control method thereof. The wireless communication system includes one or more wireless gateways. Each wireless gateway has a gateway controller and a wireless gateway transceiver that render multiple channels for connecting with one or more terminals and receiving data sent by the terminals. The wireless communication system includes a wireless transmission module that has a wireless transceiver and a controller for transmitting data. The system includes a control circuit for connecting with the wireless gateway(s) and the wireless transmission module over a connection line. The control circuit performs a control method that allows the wireless communication system to receive data from the various terminals via the wireless gateway(s). The control circuit operates the wireless transmission module to be in charge of transmitting data. The wireless transmission module is able to process the data from the plurality of wireless gateways. The system has scalability for implementing a one-to-multiple channels wireless communication technology.

The control method performed by the wireless communication system includes receiving data from one of the wireless gateways, the control circuit computing a transmission time according to size of the data packet and a transmission timestamp in the data, and generating a transmission request that enters a transmission queue with the data. Next, the control circuit retrieves the transmission request and the data from the transmission queue according to the transmission time. The transmission request and the data are then transmitted to the wireless transmission module. The wireless transmission module determines a transmission channel for delivering the data.

In one of the embodiments, the wireless gateway is such as a LoRa concentrator that is a concentrator supporting bi-directional transmission and receiving. The wireless transmission module can be a LBT module that supports the LoRa communication protocol. In the wireless communication system, the LoRa concentrator is configured to be a one-way receiver. The one-way receiver operates with the LBT module that may act as a one-way transmitter. The LBT module processes the data received by the one or more LoRa concentrators by the control circuit.

The control circuit is configured to control the wireless communication system and the wireless gateway. The wireless gateway can connect with one or more terminals for receiving data from the terminals via multiple channels. The wireless transmission module is used to transmit the data. The control circuit has a processing unit that is used to perform the control method, a wireless gateway control interface that is used to receive the data produced by the one or more wireless gateways from the one or more terminals, and a wireless transmission module control interface used to transmit the data processed by the processing unit to the wireless transmission module.

In one embodiment of the control method, the control circuit receives the data received from one of the terminals via one of the wireless gateways. A transmission time is computed according to size of the data packet and a transmission timestamp in the data. A transmission request is therefore generated and transmitted to a transmission queue with the received data. The control circuit retrieves the transmission request and the data from the transmission queue according to the transmission time. The transmission request and the data are transmitted to the wireless transmission module that will determine a transmission channel for delivering the data.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
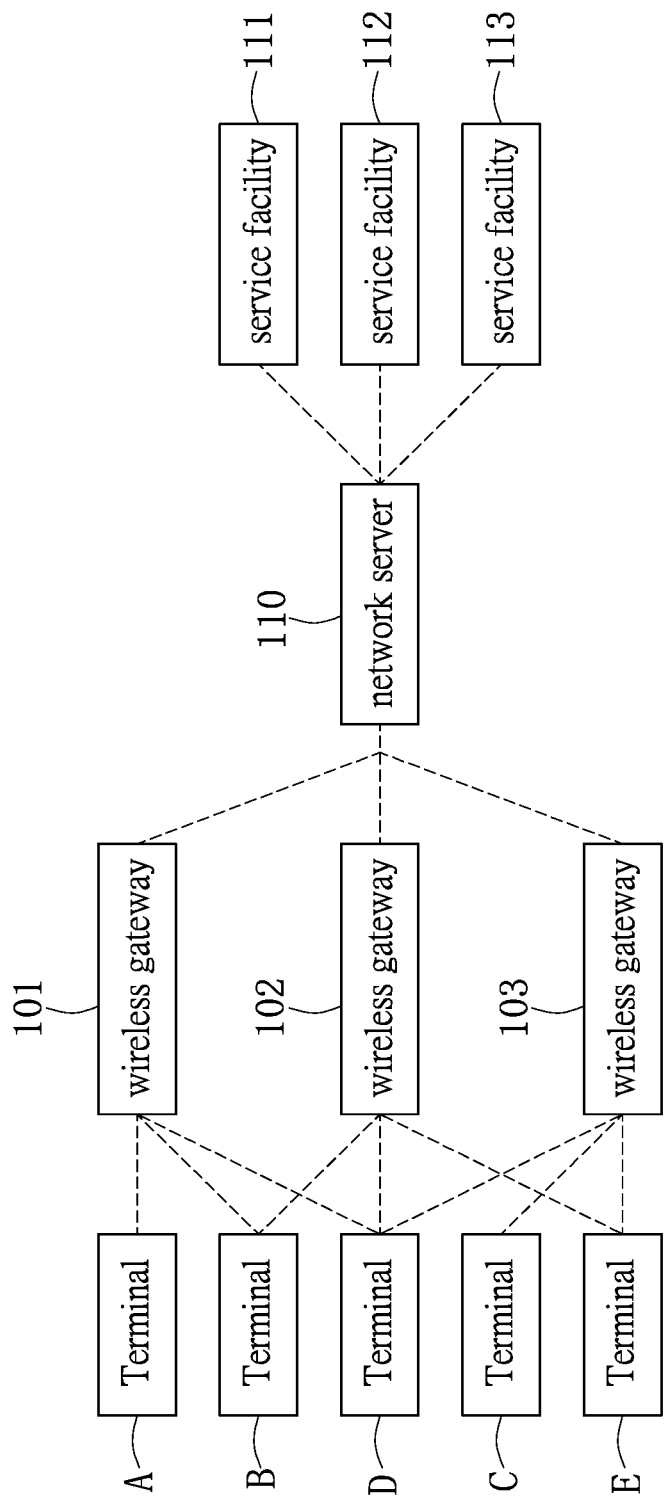
FIG. 1 shows a schematic diagram describing architecture of a conventional network system for processing data from terminals.
Figure 2:
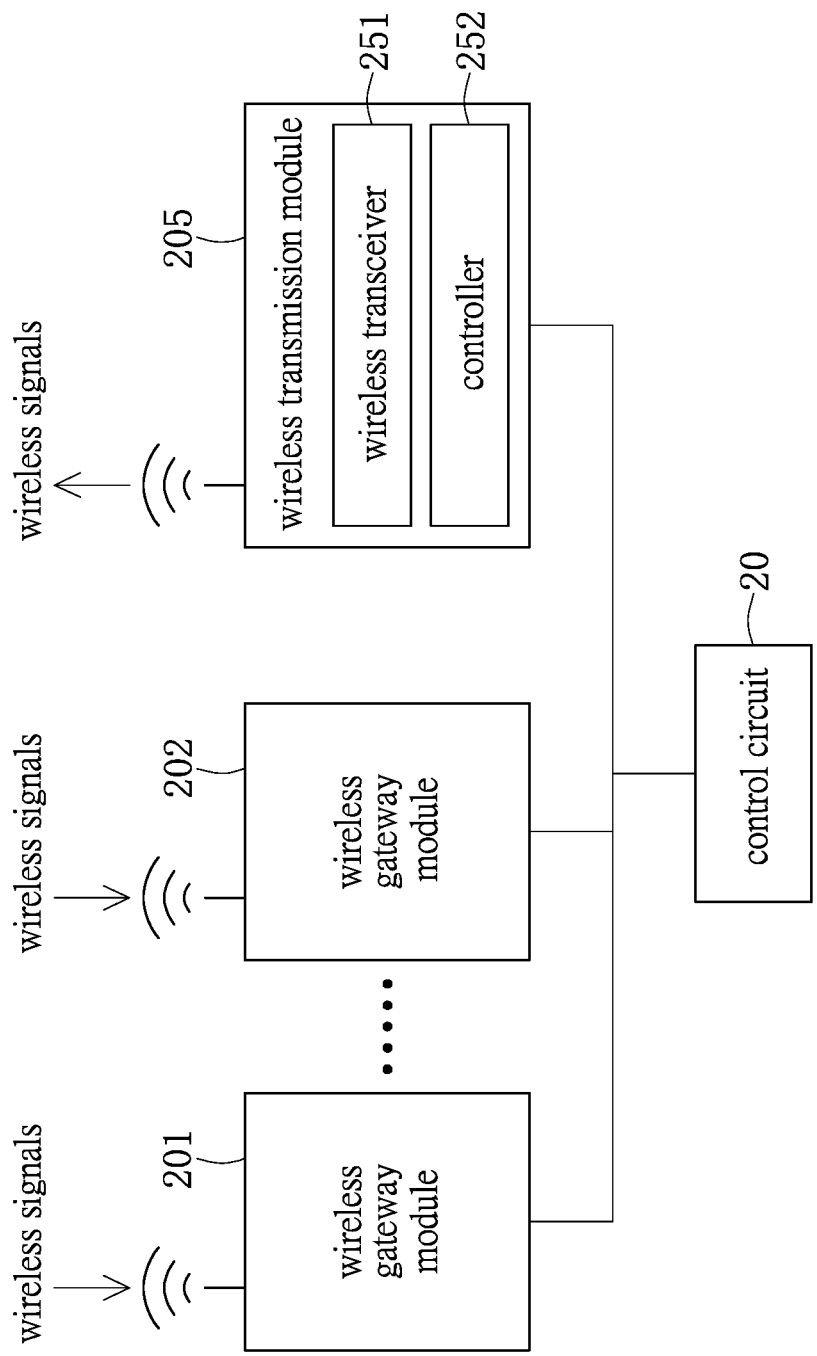
FIG. 2 shows a schematic diagram depicting architecture of a wireless communication system in one embodiment in accordance with the present disclosure.

Disclosed herein is related to a wireless communication system described in FIG. 2 showing a schematic diagram of system architecture thereof. The main components of the system are one or more wireless gateway modules 201, 202, a wireless transmission module 205 and a control circuit 20. The present exemplary example shows two wireless gateway modules 201, 202 and a wireless transmission module 205. The single wireless transmission module 205 can process the data received by the multiple wireless gateway modules 201, 202 from one or more terminals. It should be noted that the number of the devices shown in the figure is not used to limit the scope of the invention. The main circuits of the wireless gateway module 201 or 202 are such as a gateway controller and a wireless gateway transceiver, as referred to FIG. 3. The wireless gateway module 201 or 202 supports a bi-directional multiple-channel communication that is used to connect with various terminals. However, the wireless communication system in accordance with the invention preferably employs the unidirectional multiple-channel communication that is only in charge of receiving data. The aspect of unidirectional multiple-channel will not be affected by the situation of waiting for the available channel as both the receiving and transmitting tasks share the same data processing circuit. It is noted that the operation of transmission is made by the wireless transmission module 205 in the wireless communication system.

The wireless gateway module 201 or 202 is used to connect with a terminal. The terminal is such as a sensor, an electronic device or any appliance. The wireless gateway module 201 or 202 can act as a LoRa concentrator. A communication protocol between the wireless gateway module 201 or 202 and the terminal may not be limited to any specific technology since it can be WiFi™, Bluetooth™ or a kind of low-power wide area network (LPWAN).

The wireless transmission module 205 is connected with the one or more wireless gateway modules 201, 202. The wireless transmission module 205 conducts data transmission by its inner wireless transceiver 251 and controller 252. The controller 252 receives a transmission command from the control circuit 20. The transmission command records a transmission request and data. The controller 252 determines a transmission channel and transmits data via the wireless transceiver 251.

According to one of the embodiments, the wireless transmission module 205 can be a LBT (Listen Before Talk) module that supports the LoRa network communication. While the LBT module is in operation, waiting for a transmission command made by the control circuit 20 is required. The information regarding a transmission time, e.g. a timestamp, and transmission channel can be retrieved when the transmission command has been received by the LBT module. Then the control circuit 20 can designate a channel to transmit data; for example an ACK packet is responded to the terminal through the channel. The mechanism made by the LBT module can be used to detect if any channel is available by a procedure of Clear Channel Assessment (CCA). It should be noted that the transmission time can be adjusted within a specific period of time, e.g. one millisecond to ten milliseconds. Thus the wireless communication system employing the LBT mechanism can detect the channel and assess in advance if the channel is free or non-free for data transmission. The transmission can be triggered if the channel is available.

Furthermore, for expanding the wireless coverage and applications of the wireless communication system, a sufficient amount and a larger coverage of wireless gateway modules in the system will be required. For example, the applications of IoT demand processing huge sensing signals that will require sufficient amount and larger coverage of wireless gateway modules. The wireless communication system can utilize more wireless gateway modules to meet the requirement since it provides great scalability. More wireless transmission modules may be adopted to handle the huge data generated from the wireless gateway modules through multiple channels.

The control circuit 20 acts as a main circuit of the wireless communication system. The control circuit 20 can be implemented by an integration of a circuit module, an integrated circuit, software and hardware. The control circuit 20 connects with one or more wireless gateway modules 201, 202 and at least one wireless transmission module 205 via a connection line that can be a bus, a wireless connection, a wireless connection or other types of connections. When receiving data from one of the wireless gateway modules 201 and 202, the control circuit 20 determines a transmission time and instructs the wireless transmission module 205 to send out the data.

Figure 3:
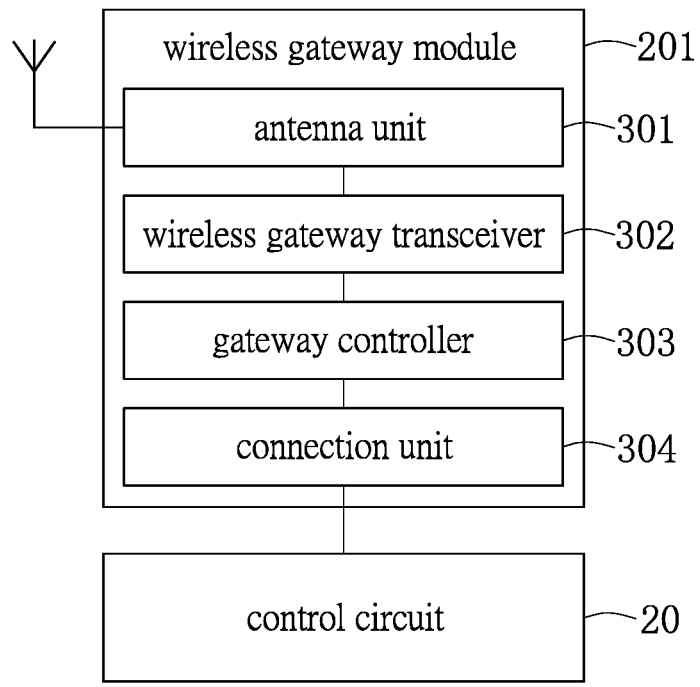
FIG. 3 shows a schematic diagram depicting circuit blocks of a wireless gateway in the wireless communication system according to one embodiment of the disclosure.

The main components of the wireless communication system are described in the following statement. Reference is made to FIG. 3 which shows a schematic diagram of circuit blocks of the wireless gateway module of the wireless communication system.

For example, the wireless gateway module 201 has an antenna unit 301, a wireless gateway transceiver 302, a gateway controller 303 and a connection unit 304. The wireless gateway module 201 operates primarily between two different network segments and connects with one or more terminals through multiple channels. The wireless gateway module 201 utilizes its antenna unit 301 to receive RF signals from every terminal. The inner wireless gateway transceiver 302 processes the RF signals from the terminal since it integrates the receiving and transmitting operations that are originally carried out by the wireless gateway module 201. Therefore, the data and the timestamp can be retrieved from the RF signals. The gateway controller 303 controls operations of the wireless gateway module 201, e.g. controlling the antenna unit 301 and timing of receiving signals by the wireless gateway transceiver 302. The gateway controller 303 also masters the data path from the connection unit 304 to the control circuit 20 via a connection line.

Figure 4:
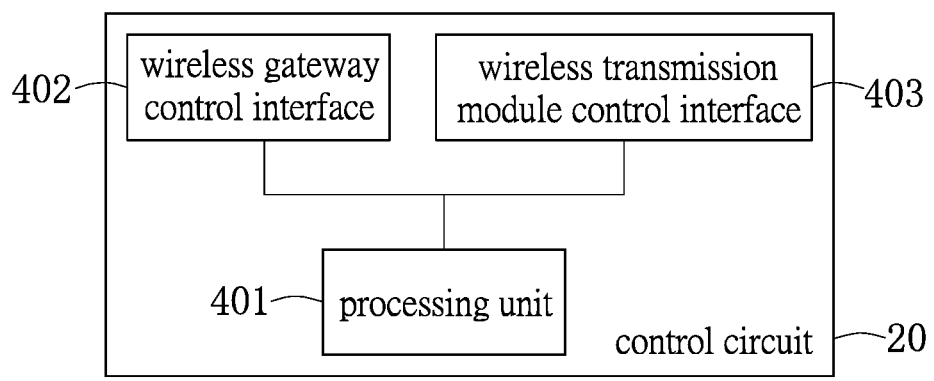
FIG. 4 shows a schematic diagram depicting circuit blocks of a control circuit in the wireless communication system according to one embodiment of the disclosure.

Reference is made to FIG. 4 which shows circuit blocks that depict the control circuit of the wireless communication system according to one embodiment of the disclosure. The main components of the control circuit 20 are such as a processing unit 401, a wireless gateway control interface 402 and a wireless transmission module control interface 403.

The processing unit 401 is used to perform a control method that is executed in the wireless communication system. The wireless gateway control interface 402 is electrically connected with the processing unit 401. Via the wireless gateway control interface 402, the control circuit 20 connects with one or more wireless gateway modules of the wireless communication system through a bus or a link in form of a wired or a wireless connection. Therefore, the control circuit 20 can receive the data generated by one or more terminals from one of the wireless gateway modules. The wireless transmission module control interface 403 electrically connects with the processing unit 401. Via the wireless transmission module control interface 403, the control circuit 20 connects with the wireless transmission module of the system through a bus or a link in form of wired or wireless connection. The control circuit 20 therefore transmits data processed by the processing unit 401 to the wireless transmission module via the wireless transmission module control interface 403.

In the control method executed by the processing unit 401, the control circuit 20 receives data from a wireless gateway module via the wireless gateway control interface 402. The data can be the data packets to be transmitted. The data packets includes SYN/ACK message. A transmission time is computed according to a size of the data packet and a transmission timestamp of the data packet. The time of the system processing the data packet is also considered for computing the transmission time. A transmission request is accordingly generated and with the data transmitted to a transmission queue. The data is consequently sent to a host.

After that, through the processing unit 401, the control circuit 20 acquires the transmission request and the data from the transmission queue according to the transmission time. The transmission request and the data are configured to be transmitted to the wireless transmission module via the wireless transmission module control interface 403. The wireless transmission module in the meantime determines a transmission channel for transmitting the data.

According to the previous embodiment, the wireless gateway module connected with the control circuit 20 can be a LoRa concentrator, and the wireless transmission module can be a LBT module that supports LoRa technology. The wireless communication system can extend its wireless coverage by linking multiple LoRa concentrators and at least one LBT module. The scalable wireless communication system can therefore be applicable to various applications.

The system allows the LoRa concentrator to implement LBT function. The control circuit 20 is configured to operate the multiple LoRa concentrators such as determining their transmission times and channels. A time for evaluating whether or not a channel of the LBT module is free and is available for transmission is also considered when computing the transmission time. Therefore, the system can normally be operated under a network environment having the multiple LoRa concentrators. When LBT module of the system receives data packet, the LBT mechanism is able to sense a channel in advance and assess if the channel is available for data transmission. The channel can be enabled to transmit the data if the channel is found to be available.

In the wireless communication system, the LoRa concentrator that is originally a two-way transmission concentrator can transmit data to the terminal by a LPWAN (Low-Power Wide-Area Network) wireless communication protocol. However, the LoRa concentrator is configured to be a one-way receiver. The one-way receiver is combined with the LBT module that may act as a one-way transmitter. Thus, the control circuit 20 is connected with the LBT module and multiple LoRa concentrators that allow the LoRa concentrators to connect with another LBT module so as to increase the number of LoRa concentrators or the number of LBT modules for extending the wireless coverage of the wireless communication system. The LBT mechanism is also applied to this system even it only provides a simplified circuitry.

The control circuit 20 controls the LoRa concentrator to take over the operation of receiving data and the LBT module to conduct data transmission. Thus, the single one communication module can simultaneously process the receiving and transmitting operations, thereby enhancing its performance. Since the communication system applies the LBT mechanism, the timestamp required by the operation of the LBT module should be considered for computing the transmission time of the system.

Figure 5:
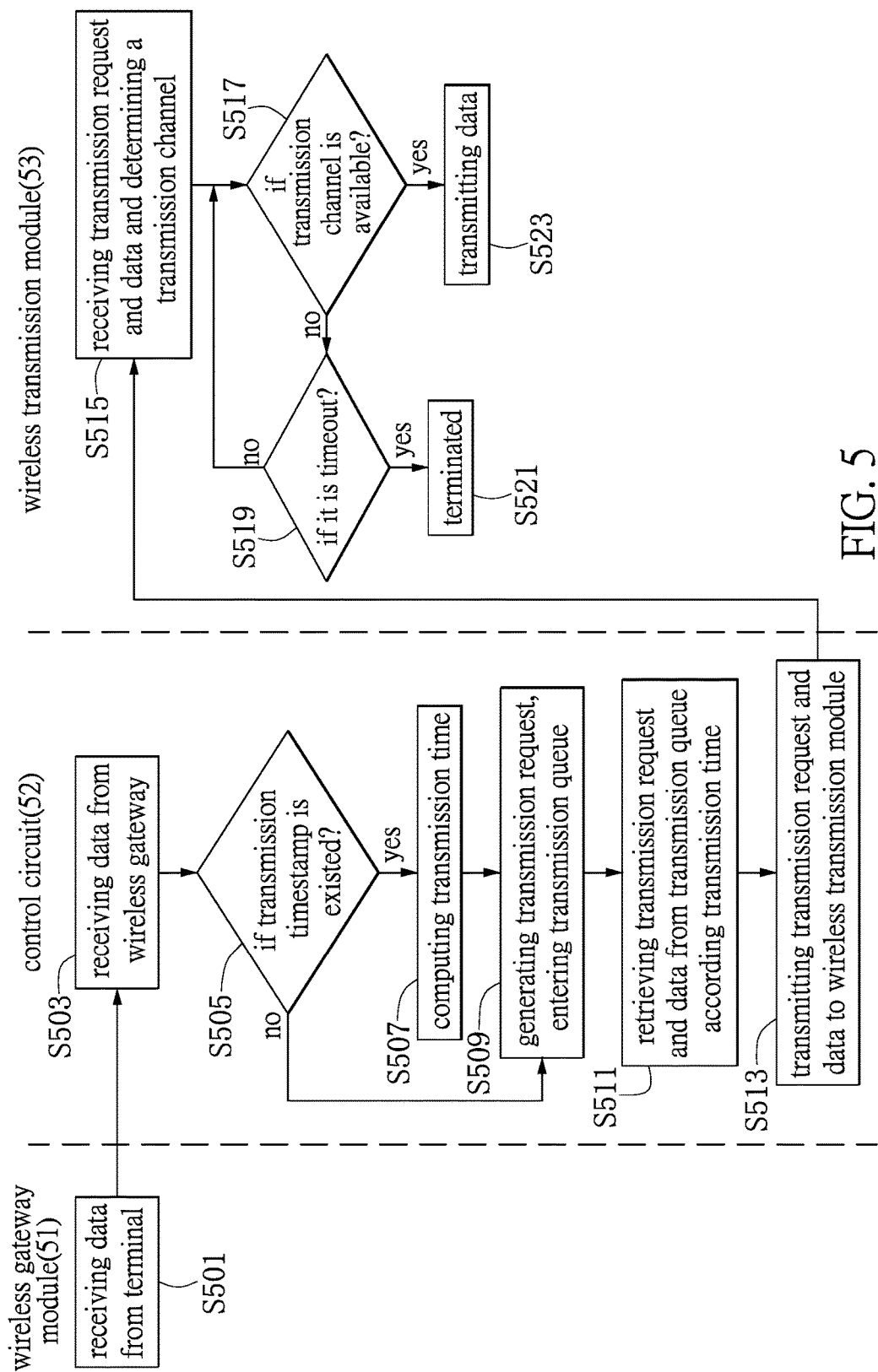
FIG. 5 shows a flow chart illustrating a control method for the wireless communication system according to one embodiment of the disclosure.

Reference is made to FIG. 5 which depicts a flow chart describing the control method of the wireless communication system in one embodiment of the disclosure. In the present example, the wireless communication system includes a wireless gateway module 51, a control circuit 52 and a wireless transmission module 53.

In the beginning, as shown in step S501, the wireless gateway module 51 receives data transmitted from a terminal. The data may include data packets and sync signals. Next, in step S503, the gateway controller of the wireless gateway module 51 issues a transmission request to the control circuit 52. The control circuit 52 receives the data from the wireless gateway module 51. In step S505, the control circuit 52 determines if any transmission timestamp is existed in the received data according to the time information of the data. It is noted that the time information is such as a timestamp. The data can initiate a sequence of transmitting a response, e.g. ACK, with respect to the sync signals. The data packet includes the information about the time sequence.

A step for determining whether or not the data includes the information of the transmission timestamp is performed before obtaining the transmission timestamp. If the data includes the information of transmission timestamp, step S507 is to compute the transmission time according to a size of the response data packet as well as the time required by the system. In one embodiment, in the step for computing the transmission time, the processing unit of the control circuit 52 inspects an estimated transmission time, e.g. including the operating time of the wireless transmission module 53, in response to the data packet. The control circuit 52 adds the estimated transmission time to the time to receive the data packet.

In step S509, the control circuit 52 generates a transmission request and sends the transmission request associated with the data into a transmission queue. This transmission request is provided to the wireless transmission module 53. If the data has no information regarding the transmission timestamp, step S507 is performed for generating the transmission request directly. The transmission request is also sent to the transmission queue in order to wait for a transmission instruction.

The data sent to the transmission queue waits for an instruction of transmission. When the control circuit 52 acknowledges the transmission time, the control circuit 52 is going to retrieve the transmission request and the data packets from the transmission queue, as shown in step S511. Next, as in step S513, the transmission request and the associated data are transmitted to the wireless transmission module 53 according to a transmission command. In step S515, the wireless transmission module 53 receives the transmission request and the associated data, and then designates a transmission channel in the meantime. This transmission channel is such as a specific frequency band for transmitting data.

While one transmission channel is specified to be the channel for delivering data, the wireless transmission module 53 conducts a determination of if the transmission channel is available, as shown in S517. If the specified transmission channel is not yet available, the controller of the wireless transmission module 53 initiates counting time and continues determining if the transmission channel becomes available. In the meantime, as shown in step S519, the controller of the wireless transmission module 53 compares the counted time with a time threshold while continuing to count time, and determines if it is a timeout.

Before the expiration of time, the wireless transmission module 53 continues determining if the transmission channel is available, such as step S517. Until timeout, the process is terminated, as shown in step S521. Before the expiration of time, the data can be sent out, such as in step S523, if the transmission channel is available for transmitting the data.

In one further embodiment, the abovementioned steps S517 to S523 embody an LBT mechanism. When the wireless communication system receives sync signals for initiating a transmission process via the wireless gateway module 51, the controller of the wireless transmission module 53 performs a process of Clear Channel Assessment (CCA) for inspecting if any transmission channel is available. The wireless communication system with LBT mechanism utilizes an LBT function to detect the channel in advance and assess if the channel is free or non-free for transmission. The function of transmission can be initiated since a free channel is found. The wireless communication system then responds to the terminal using an ACK signal.

To sum up, the disclosed wireless communication system includes one or more wireless gateway module used to receive data, and a wireless transmission module used to determine a transmission time for transmitting the data. A control circuit is provided in the system for performing a control method under this architecture. The system extracts the time information when it receives data packets. The system adds additional operating time required by the system and computes a transmission time. In addition to scalability of the coverage of wireless signals of the wireless communication system, the LBT mechanism allows the system to take the operating time of an LBT module into account for computing the transmission time. The system achieves a one-to-multiple channels wireless communication technology.

It is intended that the specification and depicted embodiment be considered exemplary only, with a true scope of the invention being determined by the broad meaning of the following claims.

What is claimed is:

1. A wireless communication system, comprising:
   one or more wireless gateway modules having a gateway controller and a wireless gateway transceiver that connect with one or more terminals via multiple channels and receive data transmitted by each terminal;
   a wireless transmission module having a wireless transceiver and a controller for transmitting data; and
   a control circuit connected with the one or more wireless gateway modules and the wireless transmission module via a connection line, the control circuit performing a control method comprising:
   receiving data from one wireless gateway module;
   computing a transmission time according to size of the data and a transmission timestamp of the data;
   generating a transmission request that is in a transmission queue with the data;
   retrieving the transmission request and the data from the transmission queue according to the transmission time; and
   transmitting the transmission request and the data to the wireless transmission module and the wireless transmission module designating a transmission channel for transmitting the data.

2. The system according to claim 1, wherein the control circuit further comprises:
   a processor used to perform the control method;
   a wireless gateway control interface, electrically connected with the processor, used to receive the data produced by the one or more wireless gateway modules from the one or more terminals; and
   a wireless transmission module control interface, electrically connected with the processor, used to transmit the data processed by the processor to the wireless transmission module.

3. The system according to claim 1, wherein the wireless gateway module acts as a Long Range (LoRa) concentrator, and the wireless transmission module acts as a Listen Before Talk (LBT) module in compliance with a LoRa network communication; in the wireless communication system, the LBT module processes the data received by the LoRa concentrators by the control circuit.

4. The system according to claim 3, wherein the control circuit further comprises:
   a processor used to perform the control method;
   a wireless gateway control interface, electrically connected with the processor, used to receive the data produced by the one or more wireless gateway modules from the one or more terminals; and
   a wireless transmission module control interface, electrically connected with the processor, used to transmit the data processed by the processor to the wireless transmission module.

5. The system according to claim 3, wherein the LoRa concentrator disposed in the wireless communication system is configured to be a one-way receiver that is combined with the LBT module that acts as a one-way transmitter.

6. The system according to claim 5, wherein a time for evaluating whether or not a channel of the LBT module is free and is available for transmission is also considered when computing the transmission time.

7. The system according to claim 6, wherein the control circuit further comprises:
   a processor used to perform the control method;
   a wireless gateway control interface, electrically connected with the processor, used to receive the data produced by the one or more wireless gateway modules from the one or more terminals; and
   a wireless transmission module control interface, electrically connected with the processor, used to transmit the data processed by the processor to the wireless transmission module.

8. The system according to claim 7, wherein the wireless communication system extends its wireless signal coverage by increasing a number of the wireless gateway modules or a number of the wireless transmission modules.

9. A control circuit in a wireless communication system comprising one or more wireless gateway modules that connect with one or more terminals via multiple channels and receive data from every terminal, and a wireless transmission module that is used to transmit data; wherein the control circuit connects with the one or more wireless gateway modules and the wireless transmission module via a connection line, wherein the control circuit comprises:
   a processor used to perform a control method;
   a wireless gateway control interface, electrically connected with the processor, used to receive the data produced by the one or more wireless gateway modules from the one or more terminals; and
   a wireless transmission module control interface, electrically connected with the processor, used to transmit the data processed by the processor to the wireless transmission module;
   wherein the control method comprises:
   receiving the data from one wireless gateway module;
   computing a transmission time according to size of the data and a transmission timestamp of the data;
   generating a transmission request that is in a transmission queue with the data;
   retrieving the transmission request and the data from the transmission queue according to the transmission time; and
   transmitting the transmission request and the data to the wireless transmission module and the wireless transmission module designating a transmission channel for transmitting the data.

10. The control circuit according to claim 9, wherein the wireless communication system extends its wireless signal coverage by increasing a number of the wireless gateway modules or a number of the wireless transmission modules.

11. The control circuit according to claim 9, wherein the one wireless gateway module acts as a Long Range (LoRa) concentrator, and the wireless transmission module acts as a Listen Before Talk (LBT) module in compliance with a LoRa network communication; in the wireless communication system, the LBT module processes the data received by the one or more LoRa concentrators by the control circuit.

12. The control circuit according to claim 11, wherein the LoRa concentrator disposed in the wireless communication system is configured to be a one-way receiver that is combined with the LBT module that acts as a one-way transmitter.

13. The control circuit according to claim 12, wherein a time for evaluating whether or not a channel of the LBT module is free and is available for transmission is also considered when computing the transmission time.

14. The control circuit according to claim 13, wherein the wireless communication system extends its wireless signal coverage by increasing a number of the wireless gateway modules or a number of the wireless transmission modules.

15. A control method for a wireless communication system that comprises one or more wireless gateway modules connected with one or more terminals via multiple channels for receiving data produced by every terminal, a wireless transmission module that is used to transmit data, and a control circuit connected with the one or more wireless gateway modules and the wireless transmission module via a connection line, wherein the control method comprises:
   the control circuit receiving data that is received from one terminal from one wireless gateway module;
   computing a transmission time according to size of the data and a transmission timestamp of the data;
   generating a transmission request that is in a transmission queue with the data;
   retrieving the transmission request and the data from the transmission queue according to the transmission time; and
   transmitting the transmission request and the data to the wireless transmission module and the wireless transmission module designating a transmission channel for transmitting the data.

16. The control method according to claim 15, wherein before acquiring the transmission timestamp of the data, determining if the data includes the transmission timestamp; if the data includes the transmission timestamp, computing the transmission time is continued; if the data does not include the transmission timestamp, the transmission request is generated and enters the transmission queue.

17. The control method according to claim 15, wherein after the transmission channel is designated, determining whether or not the transmission channel is available; if the transmission channel is not available, the wireless communication system starts timing and continues to determine if the transmission channel is available; if the transmission channel is determined to be available, the transmission channel is used to transmit data until timeout.

18. The control method according to claim 15, wherein the control circuit further comprises:
   a processor used to perform the control method;
   a wireless gateway control interface, electrically connected with the processor, used to receive the data produced by the one or more wireless gateway modules from the one or more terminals; and
   a wireless transmission module control interface, electrically connected with the processor, used to transmit the data processed by the processor to the wireless transmission module.

* * * * *